United States Patent

Goodwin et al.

Patent Number: 5,277,428
Date of Patent: Jan. 11, 1994

[54] GOLF CLUB SWING TRAINING DEVICE

[75] Inventors: Raymond W. Goodwin, Dunwoody; John F. Rilling, Roswell, both of Ga.

[73] Assignee: Golf Research Technology Corporation, Norcross, Ga.

[21] Appl. No.: 874,619

[22] Filed: Apr. 27, 1992

[51] Int. Cl.⁵ .............................................. A63B 69/36
[52] U.S. Cl. ................................ 273/186.2; 273/194 R
[58] Field of Search .............. 273/186.2, 186.3, 187.4, 273/187.5 194 R, 194 A, 194 B

[56] References Cited

U.S. PATENT DOCUMENTS

| | | | |
|---|---|---|---|
| 3,226,704 | 12/1965 | Petrash | 273/186.2 |
| 3,380,305 | 4/1968 | Charell | 273/186.2 X |
| 3,848,873 | 11/1974 | Linning | 273/186.2 |
| 5,082,283 | 1/1992 | Conley et al. | 273/186.2 |
| 5,169,151 | 12/1992 | Conley | 273/186.2 |

*Primary Examiner*—George J. Marlo
*Attorney, Agent, or Firm*—Trexler, Bushnell, Giangiorgi & Blackstone, Ltd.

[57] ABSTRACT

A device for training a golfer to make a proper and accurate golf stroke comprises a housing having a channel for variably mounting said housing on a golf club in at least a first position and a second position. A transducer is included in the housing for monitoring deviations of golf club travel from a linear direction during a golf stroke when the housing is mounted on the golf club in the first position, and for monitoring acceleration of the golf club through a golf ball during a golf stroke when the housing is mounted on the golf club in the second position. A buzzer and a light source energizable for providing the golfer with feedback indicative of the deviations or acceleration is operatively associated with the transducer. The transducer comprises optical reflective detectors for monitoring the offset positions of a mass on the upper end of a cantilevered spring having its lower end fixed to a circuit board including an aperture therein in which the mass is disposed.

8 Claims, 2 Drawing Sheets

U.S. Patent     Jan. 11, 1994     Sheet 1 of 2     5,277,428
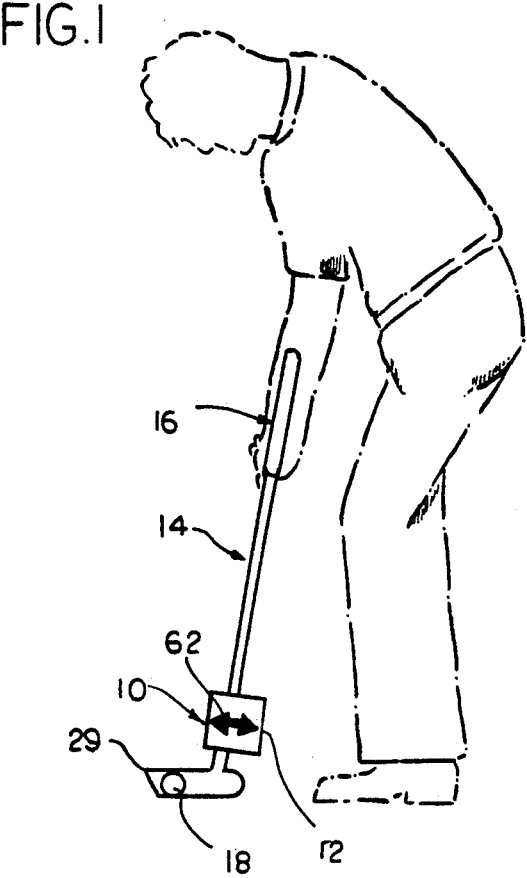
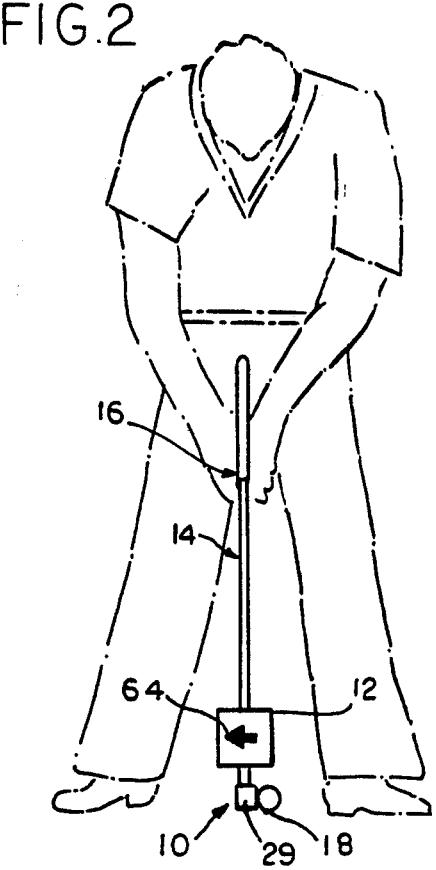
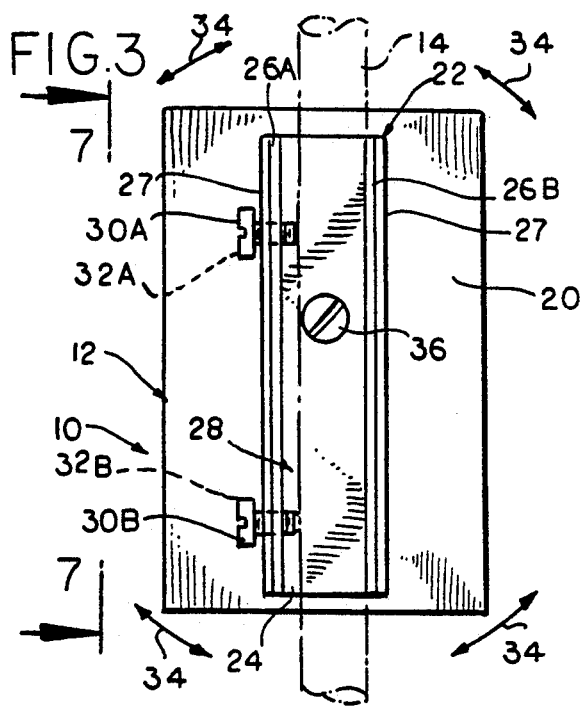
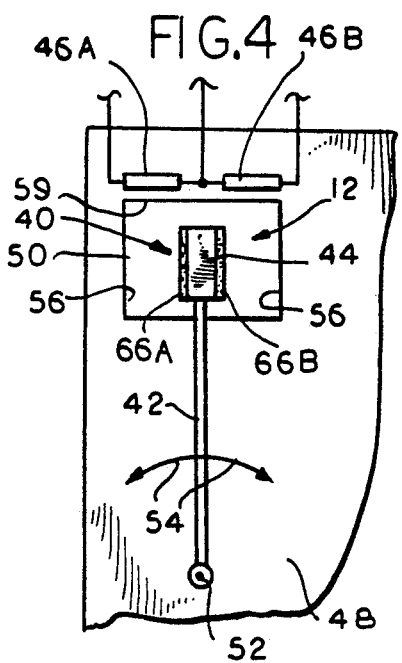

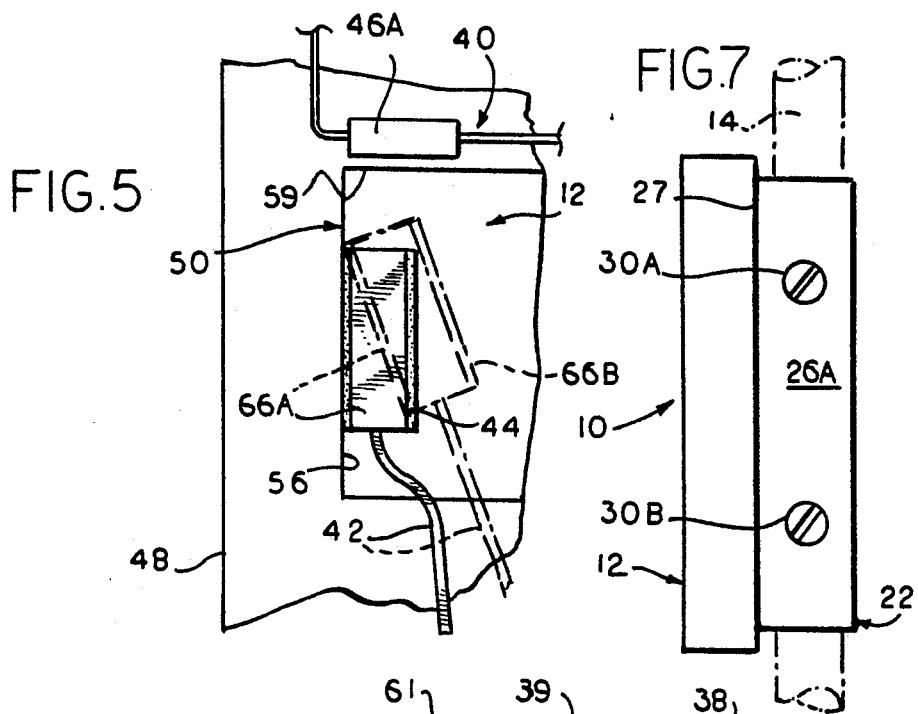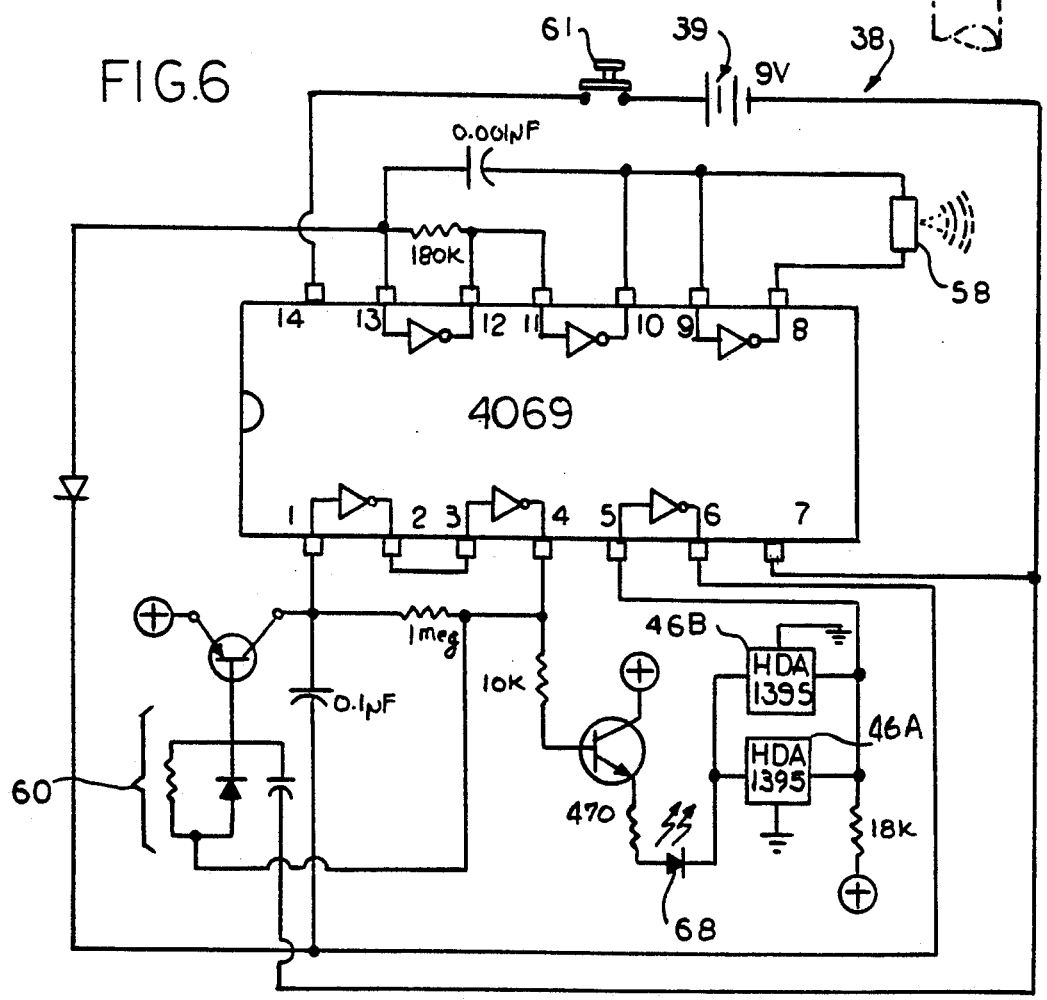

GOLF CLUB SWING TRAINING DEVICE

BACKGROUND AND SUMMARY OF THE INVENTION

The present invention relates to a novel and useful device for training a golfer to make a proper and accurate putting stroke during his golf game.

Many people desire to improve their golf scores by a variety of means and methods. In order to meet the demand for such means and methods, many golf training devices have been designed, manufactured, and sold to the general public, as well as to golf professionals. Some training devices are intended to monitor and to improve a golfer's power and accuracy off the tee during a driving stroke. Others assist a golfer in improving his fairway shots. Utilization of any of these golf training devices can assist a golfer in improving his golf score and in increasing his enjoyment of the game. However, in most golf games, approximately one half of the strokes executed by a golfer are putting strokes. Accordingly, if a golfer is to fully improve his golf game, then he must learn how to putt properly.

In a proper and accurate putting stroke, a head of the putter moves along a straight line intersecting the golf ball. Producing this straight line movement of the putter head during a putting stroke is difficult for some golfers in that it requires complex coordination among the golfer's wrists, arms and upper body motions during the stroke. However, if this straight line movement of the putter head is performed properly, then the golfer can have greater control over the trajectory of his putt, thereby decreasing his golf score and increasing his enjoyment of the game.

If the golfer is unable to master this complex coordination of bodily movements, then the head of his putter may trace a substantially arcuate path intersecting the golf ball. If this occurs, the golf ball will assume a trajectory along a line substantially tangent to the substantially arcuate path at a point of contact between the putter head and the golf ball. The tangential trajectory of the golf ball may not be the trajectory intended by the golfer.

Also, the golfer should keep the striking face of his putter, or other club, square towards the ball throughout his putting stroke. This is the proper face orientation. If the golfer rotates the shaft of the putter during the stroke, thereby opening or closing the striking face with respect to the ball, again the trajectory of the ball may be adversely affected. Accordingly, the golf ball may miss the cup, thereby resulting in the golfer having to take another putting stroke in order to successfully complete the hole. These inaccuracies can increase the golfer's golf scores, and also increase the golfer's frustration with the game.

In addition to having the putter head trace a substantially straight line during the putting stroke, a proper putting stroke requires the golfer to accelerate through the golf ball as contact is made between the ball and the putter. Accelerating through the golf ball during a putting stroke can prevent alterations in the stroke which may adversely affect the trajectory of the golf ball due to premature termination of the putting stroke. Accelerating through the ball can also provide the golf ball with an initial velocity of sufficient magnitude to insure that the ball reaches the cup. In this manner, a smooth, continuous putting stroke can be achieved, with the attendant benefits of decreased golf scores and increased enjoyment of the game.

The putt accelerometer, constructed according to the teachings of the present invention, is intended for training a golfer to utilize a proper putting stroke during his golf game. It is hoped that appropriate utilization of the putt accelerometer will decrease golf scores as well as golfer frustration with the game.

OBJECTS AND SUMMARY OF THE INVENTION

A general object of the present invention is to provide a novel and useful device for assisting a golfer in improving his putting stroke.

A more specific object of the invention is to provide a putt accelerometer for monitoring deviations of a putting stroke from a properly linear direction.

Another object of the present invention is to provide a putt accelerometer for monitoring proper acceleration of a putter through a golf ball during a putting stroke.

An additional object of the invention is to provide a putt accelerometer which provides feedback to a golfer indicative of the correctness of his putting stroke.

A further object of the present invention is to provide a putt accelerometer having an adjustable sensitivity.

Yet another object of the invention is to provide a putt accelerometer which is mountable on a golf club in a variety of positions.

An even further object of the invention is to provide a putt accelerometer which can monitor face orientation of a golf club during a golf stroke.

A putt accelerometer, constructed according to the teachings of the present invention, for training a golfer to utilize a proper putting stroke, comprises a housing having a channel for variably mounting said housing on a golf club in at least a first position and a second position. A transducer is included in the housing for monitoring deviations of golf club travel from a linear direction during a golf stroke when the housing is mounted on the golf club in the first position, and for monitoring acceleration of the golf club through a golf ball during a golf stroke when the housing is mounted on the golf club in the second position. At least one of a buzzer and an optical source, energizable for providing the golfer with feedback indicative of the deviations or acceleration, is operatively associated with the transducer.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a side elevational view of a golfer employing a putt accelerometer, constructed according to the teachings of the present invention, to monitor deviations of his stroke from a properly linear direction;

FIG. 2 is a front elevational view of a golfer employing the putt accelerometer of FIG. 1 to monitor proper acceleration of the putter through the ball during a golf stroke;

FIG. 3 is a rear elevational view of the putt accelerometer of FIGS. 1 and 2, illustrating the means for variably mounting the accelerometer on a golf club;

FIG. 4 is a partial elevational view of a printed circuit board utilized by the putt accelerometer, illustrating the construction of the monitoring means;

FIG. 5 is a magnified partial elevational view of a portion of the printed circuit board of FIG. 3, showing a mass on a leaf spring contacting a stop on the circuit board in a manner for preventing the mass from bouncing off of the board;

FIG. 6 is a schematic diagram of an electronic circuit utilized by the putt accelerometer; and FIG. 7 is a side elevational view of the accelerometer of FIG. 3.

DETAILED DESCRIPTION OF A PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring initially to FIGS. 1 through 3, a putt accelerometer 10, constructed according to the teachings of the present invention, for training a golfer to utilize a proper and accurate putting stroke during a golf game is generally illustrated. As shown, the accelerometer 10 generally comprises a housing 12 having means for variably mounting the housing 12 to a shaft 14 of a putter 16 or other golf club. The accelerometer 10 is intended to monitor putter 16 stroke path deviations from a properly linear direction, to monitor acceleration of the putter 16 through a golf ball 18 during a golf stroke, and to monitor striking face orientation of the putter 16 during a stroke. While the accelerometer 10 will be disclosed with respect to its employment with a putter 16, it is to be noted and fully understood that the accelerometer 10 can be utilized with other items without parting from the scope of the present invention.

The housing 12 is substantially box-like in construction having a substantially planar rear panel 20. The means for variably mounting the housing 12 to the shaft 14 of a putter 16 is preferably in the form of a substantially U-shaped trough or channel 22, visible in FIGS. 3 and 7, comprising a substantially planar longitudinally extending butting portion 24 for engaging the rear panel 20 and opposing flange portions 26A and 26B extending substantially perpendicularly away from opposite longitudinal edges of the butting portion 24. The channel 22 thusly defines a space 28 for accepting and firmly holding the shaft 14 of the putter 16, as illustrated in phantom in FIG. 3. An elastomeric member 27 is preferably provided, sandwiched between an engaging side of the butting portion 22 and the rear panel 20 of the housing 12, as shown in FIGS. 3 and 7.

The space 28 is of dimensions sufficient for accepting the shaft 14 at a position proximate to a head 29 of the putter 16, as shown in FIGS. 1 and 2. It is preferable to locate the accelerometer 10 on the shaft 14 proximate to the head 29 so that the stroke path and face orientation deviations and acceleration of the putter 16 through the ball 18 can be effectively monitored.

In order to secure the housing 12 to the shaft 14, a pair of threaded screws 30A and 30B threadibly extend through internally threaded bores 32A and 32B, respectively, in the flange 26A towards the flange 26B variably across the space 28. With this construction, the shaft 14 can be inserted into the space 28, and the screws 30A and 30B can be tightened so that entering ends of the screws 30A and 30B firmly clamp the shaft 14 against the opposing flanges 26A and 26B. The screws 30A and 30B can be tightened against the surface of the shaft 14 by a suitable tool, such as a screwdriver, or, more simply, by a golfer's fingers. The holding force applied by the screws 30A and 30B to the shaft 14 does not have to be very large to properly hold the accelerometer 10 to the putter 16, viz. the screws 30A and 30B need only be made "finger-tight."

It is to be noted that the screws 30A and 30B can be variably shifted in the bores 32A and 32B, respectively, to accommodate shafts 14 of varying thicknesses, and that the screws 30A and 30B are reversible for facilitating removal of the shaft 14 from the space 28, and for facilitating rotation of the housing 12 about the shaft 14. Specifically, when the screws 30A and 30B are properly loosened or rotated within the bores 32A and 32B to provide sufficient distance between distal ends of the screws 30A and 30B and the flange 26B, the housing 12 is free to rotate about an axis of elongation of the shaft 14. This allows the accelerometer 10 to be mounted to the putter 16 in a first position, shown in FIG. 1, and a second position, shown in FIG. 2. The significance of this rotatability of the housing 12 about the shaft 14 will be come more clear hereinafter.

In addition to being rotatable about the axis of elongation of the shaft 14, the housing 12 has means for allowing pivotal rotation of the housing 12 about an axis substantially perpendicular to the axis of elongation of the shaft 14, as is indicated by the arrows 34 in FIG. 3. This means is provided in the form of a pivot screw 36 extending through the butting portion 24 and the elastomeric member 27 and connected to the housing 12. The pivot screw 36 is preferably countersunk into the butting portion 24 with a head thereof being operatively accessible from the space 28. The screw 36 extends substantially laterally from the channel 22. The elastomeric member 27, shown in FIGS. 3 and 7, provides sufficient friction between the housing 12 and the channel 22 for maintaining the housing 12 in a fixed rotated disposition with respect to the shaft 14 and the channel 22 during a golf stroke.

Upon application of an appropriate force of magnitude sufficient to overcome the friction provided by the member 27, the housing 12 is capable of rotation with respect to the channel 22, thereby allowing the housing 12 to rotate about an axis substantially perpendicular to the axis of elongation of the shaft 14 when the shaft 14 is in the channel 22. When the housing 12 is rotated through a desired angle, the screw 36 can be tightened for firmly retaining the housing 12 in a desired position with respect to the channel 22 and the shaft 14. The significance of this aspect of the accelerometer 10 will become more clear hereinbelow.

The housing 12 contains an electronic circuit 38, illustrated schematically in FIG. 6, which causes the accelerometer 10 to function in the intended fashion. The circuit 38 is preferably powered by a battery 39. The circuit 38 includes a novel transducer 40 generally comprising a leaf spring 42 having a mass 44 at one end thereof, and detectors 46A and 46B for detecting the presence of the mass 44, as illustrated in FIG. 4. The mass 44 causes the spring 42 to act as an inverted pendulum, as will be described in greater detail below. In the preferred construction illustrated in FIG. 6, the circuit 38 also includes inverting amplifiers embodied on a chip commonly known by the number 4069, and the detectors 46A and 46B are preferably of the infrared reflective type commonly known by the number HDA1395.

The circuit 38 is contained on a printed circuit board 48 of appropriate construction. The printed circuit board 48 is mounted within the housing 12 so that the board 48 defines a vertical plane in the housing 12. The board 48 has a aperture 50 therein of sufficient dimensions to accept the mass 44, and to allow the mass 44 to shift therewithin with the spring 42. While the aperture 50 is shown in FIGS. 4 and 5 as being substantially rectangular in configuration, the aperture 50 may take on other suitable configurations as well.

The spring 42 is fixedly mounted at one end to a base 52 extending substantially perpendicularly upwardly from the board 48. The base 52 is disposed on the board 48 below the aperture 50 so that the spring 42 extends upwardly to locate the mass 44 within the aperture 50. The base 52 is of appropriate construction for allowing the spring 42 to flex or pivot about the base 52, as is indicated by the arrows 54 in FIG. 4. Flexing of the spring 42 allows the mass 44 to move between boundaries or edges 56 of the aperture 50. The location of the boundaries 56 of the aperture 50 are predetermined for limiting motion of the mass 44 within the aperture 50.

The detectors 46A and 46B for sensing presence of the mass 44 are preferably located adjacent a top edge 59 of the aperture 50. The detector 46A and 46B are electrically connected to the remainder of the circuit 38 as indicated in FIG. 6. Basically, the detectors 46A and 46B comprise a source of electromagnetic, specifically infrared, radiation, such as a light-emitting diode and the like, and a receptor, such as a photocell, sensitive to the presence of the infrared radiation propagating from the source.

The detectors 46A and 46B function by sending out infrared radiation which encounters and is incident upon the mass 44 when the mass 44 has shifted into an appropriate position. The incident radiation, or at least a portion thereof, is reflected off of the surface of the mass 44 back towards the detectors 46A and 46B, where the reflected radiation is sensed by the photocell or other means on the detectors 46A and 46B when the mass is proximate to the detectors 46A and 46B. The construction of the detectors 46A and 46B is chosen so that the mass 44 must be in close proximity to one of the detectors 46A and 46B for it to sense the reflected radiation.

In some circumstances, the golfer may impart forces of sufficient magnitude to the accelerometer 10 to cause the mass 44 to forcibly contact the edges 56 of the aperture 50. This may cause the mass 44 to bounce off of the edges 56, and to shift into a position where the detector 46 can no longer sense the presence of the mass 44. To prevent this from occurring, the spring 42, the mass 44, and the edges 56 are configured so that the mass 44 can engage the edges 56 in the fashion illustrated in FIG. 5. Specifically, the mass 44 initially contacts either edge 56 at a point 57, as shown in broken lines in FIG. 5, and the spring 42 flexes, thereby allowing the mass 44 to engage that edge 56 in a substantially planar fashion. The flexing of the spring 42 serves to absorb and to transform kinetic energy, thereby prohibiting the mass 44 from bouncing off of the edge 56. In addition, opposite edge-contacting sides of the mass 44 have cushions, 66A and 66B, preferably in the form of strips of felt, as shown in FIGS. 4 and 5, for absorbing forces and cushioning the impact between the mass 44 and the edges 56 of the aperture 50.

Because the accelerometer 10 is intended to function as a training tool for golfers, the circuit 38 is provided with means for providing the golfer with feedback indicative of the correctness of his golf swing. This feedback means is desirable because even a poorly executed and inappropriate putting stroke can cause a golf ball 18 to enter the cup. It is understood that the preferred modality for feedback is audio, however, it is also desirable to provide visual feedback, especially upon consideration of deaf golfers. Accordingly, the circuit 38 includes a buzzer 58, or other source of an audio tone, and a source of a visual signal, such as a light-emitting diode 68 and the like, illustrated schematically in FIG. 6. As will be described hereinbelow, the buzzer 58 and the diode 68 are simultaneously activated when either of the detectors 46A or 46B senses the presence of the mass 44.

When either of the detectors 46A and 46B senses the mass 44, the buzzer 58 and the diode 68 are activated or energized by the circuit 38, thusly producing an audio and a visual feedback signal to the golfer. The circuit 38 is constructed so that the buzzer 58 and the diode 68 are energized as long as either detector 46A or 46B can sense the presence of the mass 44, as described above. Once the buzzer 58 and the diode 68 are energized, the mass 44 may shift with respect to the detectors 46A and 46B into a position where neither detector 46A nor 46B can sense the presence of the mass 44. When this occurs, the circuit 38 deactivates the buzzer 58 and the diode 68, and no tone or light is issued.

Once the buzzer 58 and the diode 68 are deactivated, the circuit 38 must be reset in order for the buzzer 58 and the diode 68 to be activated again when either of the detectors 46A and 46B sense the presence of the mass 44. To do this, the circuit 38 includes a circuit-resetting portion 60, illustrated schematically in FIG. 6, for resetting the circuit 38. The portion 60 is constructed so that the circuit 38 is automatically reset one and one-half seconds after the buzzer 58 and the diode 68 are activated. Accordingly, when either of the detectors 46A and 46B sense the presence of the mass 44, the circuit 38 activates the buzzer 58 and the diode 68 for as long as a detector senses the presence of the mass 44, thereby providing the golfer with feedback. When the mass 44 moves away from the detectors 46A or 46B, the buzzer 58 and the diode 68 are deactivated. One and one half seconds following deactivation, the circuit 38 is reset and the accelerometer 10 is ready for another stroke.

With the structure and construction of the putt accelerometer 10 being thusly disclosed, the functionality thereof will now be discussed in detail. It is to be noted that further structural requirements of the accelerometer 10 will become more clear in the following discussion. Also, it is to be understood that, while the accelerometer 10 will be discussed with relation to a specific employment with a putter 16, the accelerometer 10 can be used with other devices as well.

For a golfer to utilize the accelerometer 10 for learning a proper putting stroke, the golfer must first mount the accelerometer 10 to the shaft 14 of his putter 16. To do this, the golfer tightens the screws 30A and 30B, as described in detail hereinabove. Mounting the accelerometer 10 proximate to the head 29 increases the sensitivity of the accelerometer 10 because the head 29 travels at a speed greater than that of other portions of the putter 16 during a golf stroke.

The golfer will have to decide if he wishes to monitor deviations of his putting stroke from a proper linear direction and to monitor proper striking face orientation, or to monitor proper acceleration of the putter 16 through the golf ball 18 during a golf stroke because the accelerometer 10 must be mounted in distinctly different positions, illustrated in FIGS. 1 and 2, to perform those separate functions. Specifically, the accelerometer 10 must be mounted in the position shown in FIG. 2 to monitor acceleration through the ball, and in the position shown in FIG. 1 to monitor deviations of the stroke and proper face orientation.

To monitor deviations of the stroke and proper face orientation, the accelerometer 10 is mounted on the shaft 14 so that a vertical plane containing the accelerometer 10 is substantially parallel to a vertical plane containing a striking face of the head 29 of the putter 16. In this position, the mass 44 is able to pivot with the spring 42 in the directions indicated by the arrow 62 illustrated in FIG. 1 towards one of the detectors 46A or 46B, depending upon orientation of the accelerometer 10 and depending upon orientation of the striking face of the putter 16.

Accordingly, if the golfer swings the putter 16 through a substantially arcuate path, instead of swinging in a properly linear direction during his golf stroke, centrifugal accelerations and attendant forces will be generated which cause the mass 44 on the spring 42 to move in either of the directions indicated by the arrow 62 towards either of the detectors 46A and 46B. If the centrifugal forces or accelerations are of sufficient magnitude to shift the mass 44 proximate to either of the detectors 46A or 46B so that the presence of the mass 44 is sensed thereby, as described hereinabove, the buzzer 58 and the diode 68 will be energized, and will issue an audio and a visual feedback signal to the golfer. In this way, the golfer will immediately know that his golf stroke is improper.

Furthermore, if the golfer does not maintain proper striking face orientation during his stroke, viz. opening and/or closing the face during the stroke, the mass 44 will again shift proximate to either of the detectors 46A or 46B. The circuit 38 will again energize the buzzer 58 and the diode 68 to notify the golfer of his incorrect swing.

Once the golfer has completed his golf stroke, the mass 44 will shift away from the detector 46 under the influence of forces generated by the spring 42, and the buzzer 58 and the diode 68 will cease issuing the feedback signals. One and one-half seconds later, the resetting circuit portion 60 resets the circuit 38. Once reset, the accelerometer 10 is ready for another golf stroke.

It is to be noted that if the golfer executes a golf stroke having a properly linear direction and a proper striking face orientation, then the mass 44 will not shift proximate to the detectors 46A and 46B. Accordingly, the buzzer 58 and the diode 68 will not be energized, and no feedback signals will issue. Therefore, if the golfer executes his golf stroke, and no feedback signals issue, he will know that he has executed a properly linear and face oriented golf stroke.

If the golfer desires to monitor acceleration through the ball during his golf swing, the accelerometer 10 must be mounted in the position illustrated in FIG. 2. To position the accelerometer 10 in this fashion, the screws 30A and 30B are loosened so as to sufficiently disengage from the shaft 14. The shaft 14 can now rotate within the channel 22, and the screws 30A and 30B can again be properly tightened against the shaft 14 to firmly hold the accelerometer 10 on the shaft 14 in the position shown in FIG. 2. In this position, a vertical plane containing the accelerometer 10 is substantially perpendicular to a vertical plane containing the striking face of the head 29 of the putter 16.

With the accelerometer 10 in this position on the shaft 14, the mass 44 on the spring 42 will shift in the direction indicated by the arrow 64 illustrated in FIG. 2 towards one of the detectors 46A or 46B, depending upon particular orientation of the housing 12, when the golfer properly accelerates through the ball during his golf stroke.

Specifically, if the golfer accelerates through the ball during his golf stroke, inertia will cause the mass 44 to remain at rest in space with respect to the printed circuit board 48. As the printed circuit board 48, along with the putter 16, accelerates forward during the stroke, the detector 46A or 46B will move forwardly towards the mass 44 as the spring 42 flexes in the indicated direction. If the golfer accelerates sufficiently, the detector 46A or 46B will be able to sense the presence of the mass 44, and the buzzer 58 and the diode 68 will be energized, thereby issuing forth feedback signals.

In a proper golf stroke, the golfer will accelerate through the ball and follow through, thereby insuring that he does not terminate his stroke prematurely, and avoiding the problems often associated therewith which can lead to increased golf scores. As the golfer accelerates through the ball, he will receive the feedback signals, indicating that he is properly accelerating during his stroke. If the golfer properly executes his stroke, including a follow through, then the golfer will receive the feedback signals during the entire duration of his stroke.

After the golfer properly follows through with his stroke (i.e. by accelerating through the ball), the mass 44 will shift, under the influence of forces generated by the spring 42, into a position where the detectors 46A and 46B can no longer sense the presence of the mass 44. Accordingly, the buzzer 58 and the diode 68 will be deactivated. The circuit 38 must now be reset by the circuit portion 60 in the above-described manner for monitoring further golf strokes.

Because different golfers will apply forces of different magnitudes to a putter 16 during a golf stroke, further depending upon the length of the putt, the accelerometer 10 has means for adjusting sensitivity thereof in the form of the pivot screw 36. By appropriately adjusting the accelerometer 10 by means of the pivot screw 36, the sensitivity of the accelerometer 10 can be adjusted to meet the requirements of different golfers. Also, the adjustability of the accelerometer 10 allows a golfer to gradually increase the linearity and acceleration of his golf stroke.

By loosening the pivot screw 36, the housing 12 may be manually rotated with respect to the channel 22. It is to be noted, however, that the elastomeric member 27 can provide sufficient friction between the housing 12 and the channel 22 so that the screw 36 may be maintained in a relatively loosened disposition, thereby facilitating rotation of the housing 12. As the housing 12 is rotated, the orientation of the transducer 40 is affected. By appropriately orienting the transducer 40, the sensitivity thereof can be adjusted. Once the desired orientation and sensitivity of the transducer 40 has been achieved, the pivot screw 36 can be tightened, thereby firmly retaining that orientation. The accelerometer 10 is then mounted to the shaft 14 of the putter 16 as described hereinabove.

As illustrated in FIG. 4, the leaf spring 42 extends substantially perpendicularly with respect to the horizontal when the accelerometer 10 is mounted on the shaft 14 in the positions illustrated in FIGS. 1 and 2. However, by rotating the housing 12 with respect to the channel 22 and mounting the accelerometer 10 on the shaft 14 as described above, the spring 42 can be gravity biased, thereby changing the magnitude of forces needed to shift the mass 44 into a position where its presence can be sensed by the detectors 46A and 46B.

By rotating the housing 12, and thereby the transducer 40 counterclockwise as viewed in FIG. 4, the detectors 46A and 46B are offset from the horizontal. As this occurs, gravitational forces shift the mass 44 towards the detector 46A irrespective of accelerations imparted to the accelerometer 10 by motion of the putter 16. This effectively reduces the magnitude of the forces needed to shift the mass 44 into a position where the detector 46A can sense its presence. Accordingly, the accelerometer 10 has an increased sensitivity. The opposite is true if the transducer 40 is rotated clockwise as viewed in FIG. 4. As this occurs, gravitational forces shift the mass 44 away from the detector 46A irrespective of accelerations imparted to the accelerometer 10 by motion of the putter 16. This effectively increases the magnitude of the forces needed to shift the mass 44 into a position where the detector 46A can sense its presence. With this orientation, the accelerometer 10 has decreased sensitivity.

Another embodiment of the invention utilizes only the detector 46A. This embodiment is constructed substantially similarly to the above-discussed embodiment, except that the detector 46B is eliminated. This alternative embodiment also functions substantially similar to the above-discussed embodiment, however, because the detector 46B is eliminated, the effectiveness of monitoring proper striking face orientation is reduced.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A device for training a golfer to make a desired golf stroke comprising: a housing; means for variably mounting said housing on a golf club having a striking face in at least a first position and a second position; monitoring means for monitoring deviations of golf club travel from a linear direction and striking face orientation during a golf stroke when the housing is mounted on the golf club in the first position, and for monitoring acceleration of the golf club through a golf ball during a golf stroke when the housing is mounted on the golf club in the second position; said monitoring means including a generally vertical cantilevered flexure spring having a first end fixed with respect to said housing and an opposite free end; a mass on said flexure spring spaced from said fixed end; said flexure spring flexing during acceleration of the golf club for causing shifting of said mass relative to said housing from a starting position to an offset position; a detector mounted for detecting said mass at said offset position and providing a signal; and feedback means energizable in response to said signal for providing the golfer with feedback indicative of the deviations or acceleration operatively associated with the monitoring means.

2. A device for training a golfer as defined in claim 1 wherein the feedback means comprises at least one of a source of audio signals and a source of visual signals.

3. A device for training a golfer as defined in claim 1 which includes an electronic circuit disposed on a printed circuit board; the printed circuit board having an aperture thereon; one end of the spring being attached to the mass and an opposite end of the spring being mounted on the printed circuit board so that the mass is disposed within the aperture; and the detector being disposed on the printed circuit board adjacent the aperture.

4. A device for training a golfer as defined in claim 3 wherein the electronic circuit comprises a resetting circuit portion for resetting the electronic circuit for successive golf strokes.

5. A device for training a golfer as defined in claim 3 which includes a second detector and said circuit board at a side of the mass opposite from said first detector, the mass being shiftable between said offset position adjacent the first detector, a second offset position adjacent the second detector, and a said starting position offset from and between both the first detector and the second detector; and the electronic circuit energizing the feedback means when the mass is in either of the first mentioned offset or the second mentioned offset position.

6. A device for training a golfer as defined in claim 1 wherein the detector comprises an optical reflective detector.

7. A device for training a golfer as defined in claim 1 further comprising means for adjusting sensitivity of the monitoring means.

8. A device for training a golfer as defined in claim 7 wherein the means for adjusting the sensitivity of the monitoring means comprises a pivot screw for variably rotating the housing for gravity biasing the monitoring means.

* * * * *